Figure 1:
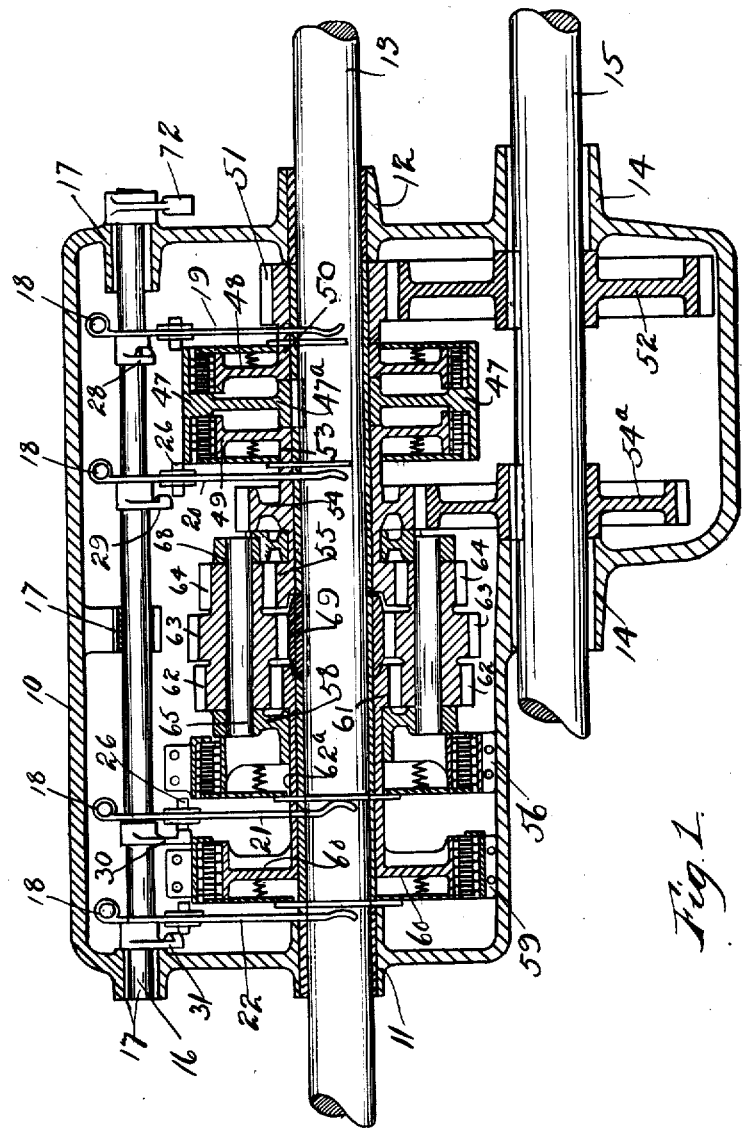

H. CAVE.
TRANSMISSION MECHANISM.
APPLICATION FILED MAY 9, 1907.

902,856.

Patented Nov. 3, 1908.
3 SHEETS—SHEET 1.

Witnesses
A. F. Boig
C. D. Ogden

Inventor
Henry Cave.
By Howard E. Barlow
Attorney

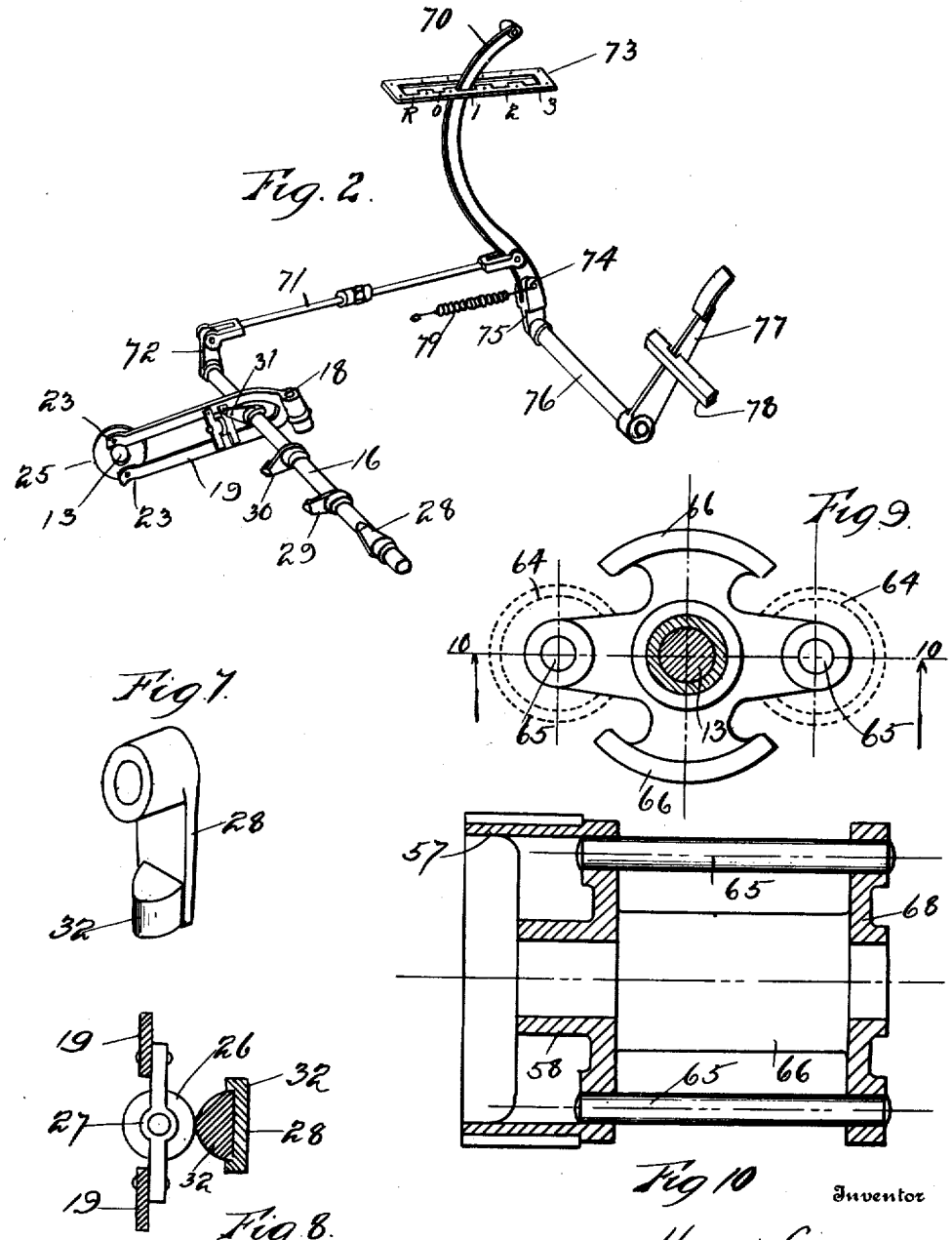

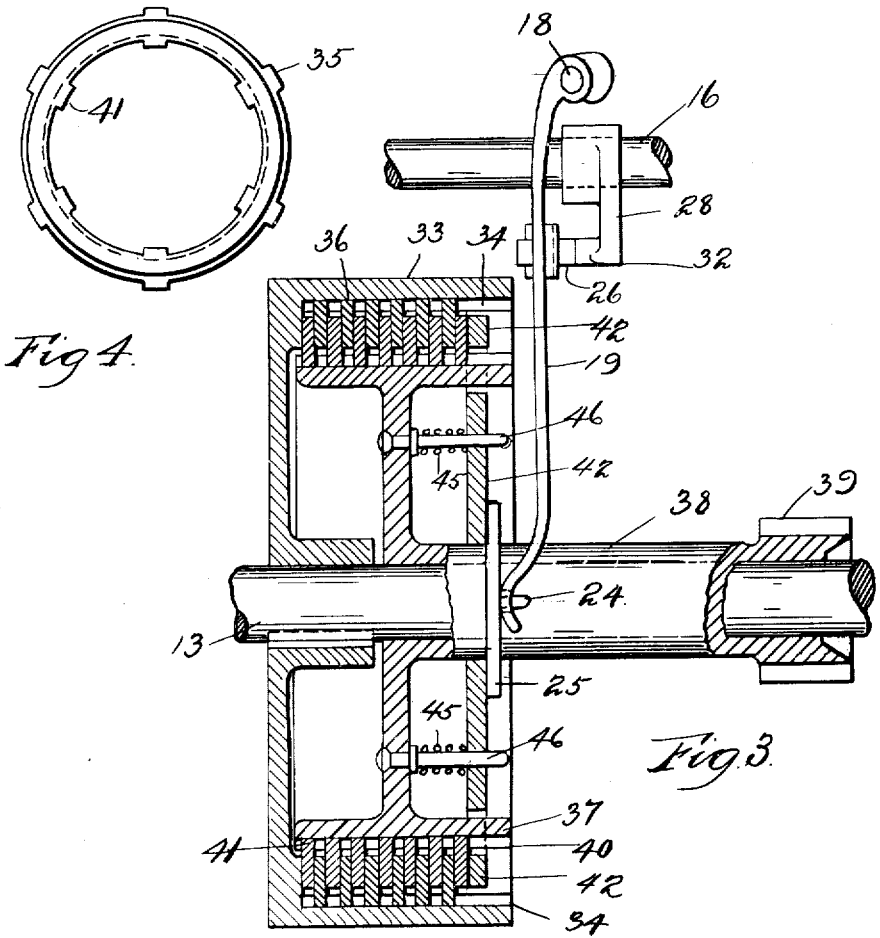

UNITED STATES PATENT OFFICE.

HENRY CAVE, OF PROVIDENCE, RHODE ISLAND.

TRANSMISSION MECHANISM.

No. 902,856.　　　Specification of Letters Patent.　　　Patented Nov. 3, 1908.

Application filed May 9, 1907. Serial No. 372,722.

*To all whom it may concern:*

Be it known that I, HENRY CAVE, a subject of Great Britain, residing at the city of Providence, in the county of Providence and State of Rhode Island, have invented certain new and useful Improvements in Transmission Mechanism, of which the following is a specification, reference being had therein to the accompanying drawing.

This invention relates to transmission mechanism for motor driven vehicles, and has for its object to provide a simple and effective means for varying the speed ratio between the motor and the road wheels.

A further object is to obtain a great reduction without the use of large gear wheels, in such a manner that the higher speeds shall be obtained by transmitting the power through a minimum number of gears, thus reducing the frictional loss to a minimum, and still retain the high ratio for the low speed.

My improved transmission system is a combination of the planetary and the individual clutch systems, in which the good points of both are retained and the disadvantages of each are entirely obviated. This system may be used in any kind of motor driven vehicle but the style here shown and described is more particularly adapted for heavy truck work in which a double reduction is ordinarily required on the low gears. This system has many advantages over the slide gear system, among others being that the mechanism may be readily shifted from one speed to the other by the action of a hand lever, without the use of a foot lever, the shift being made through the medium of clutches instead of by sliding gears; the power may also be disconnected by means of a foot operated lever without the addition of a special clutch for that purpose, thus rendering it possible to disconnect the power without the use of the hands. By this construction the mechanism may be thrown quickly from any one speed to any other without fear of damage, which is of course impossible in the slide gear system where such a shift would be apt to strip the gears.

One essential feature of my device is that a planetary system of gearing is employed in combination with the individual clutch system whereby a low velocity of gears and relative rotating parts is obtained. The difference in speed of the driving shaft and the reverse driving pinion in the ordinary individual clutch system is very excessive, which excessive speed is entirely obviated in the present construction. By the use of this system the low gear and the reverse may be used as a brake if desired, which is impossible with a slide gear system, thus obviating the necessity of carrying a second or emergency brake as is customary with such vehicles.

Another feature of my invention is that the mechanism is so arranged that by the continuous movement of one lever, the forward operating gear may be disconnected and the reverse gear brought into operation without fear of damaging the gears or mechanism, which result cannot be obtained by the use of the slide gear system.

It will be observed that the mechanism is so simplified as to obviate the necessity of employing a skilled attendant to successfully operate the vehicle, the arrangement of the levers being such that no movement of the same under any conditions can damage the operating parts.

The invention consists of other novel features and parts and combinations of the same as will be fully described hereinafter and then pointed out in the appended claims.

A practical embodiment of the invention is represented in the accompanying drawings, forming a part of this specification, in which similar characters of reference indicate corresponding parts in all the views.

In the drawings: Figure 1—is a sectional view through the gear casing and a portion of the mechanism therein contained. Fig. 2—shows the hand operating lever and foot operating lever and their connection to the cam shaft and clutch through the spring operating fork. Fig. 3—is an enlarged sectional view of one of the clutches and the relative position of the pivoted spring fork and actuating cam. Fig. 4—is a view showing the relative positions of two of the adjacent clutch disks. Fig. 5—illustrates a portion of one of the disks as having its edge cut so as to form spring fingers to hold the disks apart. Fig. 6—is an edge view of the same showing the fingers as raised from the face of the disk. Fig. 7—is a perspective view in detail showing one of the cam arms. Fig. 8—shows one of the cam portions in section and in engagement with a roller held in the spring fork. Fig. 9—is a top view of the planetary gear frame. Fig. 10—is a side elevation of this frame sectioned on line 10—10 of Fig. 9, with an inner clutch ring connected thereto.

Referring to the drawings at 10 is the gear casing which also incloses the other mechanism that requires more particularly to be protected from dust and be supplied with considerable lubrication. At 11 and 12 in this casing are bushed bearings for the reception of the driving shaft 13, and at 14—14 are another set of similar bearings for the counter or gear driven shaft 15. This shaft may be connected to drive the road wheels (not shown) either through sprockets and chains, gears, or any other convenient or suitable power transmitting means. The cam shaft 16 also receives its bearings at 17—17 in this casing. Pivoted in the casing at 18—18 to one side of this cam shaft are the spring forks 19, 20, 21 and 22. These forks are provided with two comparatively long resilient fingers or tines which straddle the cam shaft and extend from their pivoting point 18 down to the center of the driving shaft 13, the lower ends being provided with holes 23—23 (see Fig. 3), for the reception of the pins 24 extending outward from the friction washer 25 against which these lower ends rest.

A little contact roll 26 is supported in bearings 27 and secured by riveting or other convenient means to the tines of each of the spring forks, as illustrated in Fig. 8. Mounted on and fixed to the cam shaft and in position so that they may be made to engage these contact rolls 26 are the cam arms 28, 29, 30 and 31. To the lower ends of each of these arms is secured a hardened cam portion 32 the same being arranged to engage the roller 26 on its individual fork whenever it is desired to set the clutch engaged by that fork.

In the construction of my improved device I have preferably used an adaptation of what is commonly known as the disk clutch which is illustrated in the drawings. These clutches are ordinarily made with an outer casing or clutch ring 33, which may be fixed or held against rotation or keyed to the crank or driving shaft 13 in the manner illustrated in Fig. 3. This ring is splined at intervals on its internal face as at 34—34 for the reception of the fixed outwardly extending keys 35 in every alternate disk 36.

A broad faced rim or inner clutch ring 37 is shown in this figure as being connected through the sleeve 38 to the gear 39 and is provided on its periphery with a corresponding number of splines or key-ways 40 for the reception of the inwardly projecting keys 41—41 of every alternate disk. These disks may be made of very thin material so that a large number may be employed in a small space, and the outer edge of each disk may be cut as at 43 (see Fig. 5), and have one or more lips raised from its face, as illustrated at 44 in Fig. 6, thereby forming spring fingers which will automatically separate the disks after the faces have been brought into contact. These disks are pressed together by the fork through the medium of the plate 42 which extends up through recesses in the rim 37 to engage said disks, said plate being returned or carried back by the tension of the springs 45 on the pins 46.

In the arrangement shown the outer clutch ring 47 is keyed to the driving shaft at 47ª, said ring being arranged in a double form to engage either the clutch portion 48 or the clutch portion 49, as desired. The clutch portion 48 is connected through the sleeve 50 to the gear 51 which gear in turn is connected to the counter shaft 15 through the large gear 52, and the clutch portion 49 is connected through the sleeve 53 to the gear 54 and also to the gear 55, said gear 54 being connected to the counter shaft through its gear 54ª.

In working on the low speeds and reversing mechanism the outer brake ring 56 of the slow speed is fixed to the casing, and the inner brake ring 57 is connected to the planetary gear system through the frame 58 (see Fig. 10). The outer ring 59 of the reverse brake is also held in a fixed position to the casing, and the inner ring 60 is connected to the gear 61 through the sleeve 62ª. In this planetary system of gearing a frame having two ends 58 and 68 may be constructed similar to that illustrated in Figs. 9 and 10, whereby two or more sets of gears of different relative sizes 62, 63 and 64 are all connected together and mounted on the shafts 65—65, said frame being held together by the tie members 66—66, the gear 62 meshing with the gear 61, 64 with 55, while 63 meshes with the gear 69, which latter gear is keyed to the driving shaft 13. The cam shaft 16 in this casing may be operated by the hand lever 70, as illustrated in Fig. 2, through the connecting rod 71 and arm 72. The upper end of this lever is arranged to engage the notches in the retaining plate 73, the notch marked with a "0" denoting the neutral position, "R" the reverse, "1" the first speed, "2" the second speed, and "3" the highest speed. The lower end of this hand lever is pivoted at 74 to the arm 75, which arm is mounted on the rotatable shaft 76 to the outer end of which is connected the foot operating lever 77. This lever is held up in its normal position against the stop 78 by means of the tension spring 79. It will be seen by this construction that the cam shaft may be operated by foot as well as by hand as a pressure on the foot lever will carry forward the lower or pivoting point of the hand lever thereby rotating the cam shaft to obtain the desired speed.

The operation of my improved transmitting mechanism may be more fully described as follows:—In starting the car forward the hand lever is carried from the "0" into the first notch thereby rotating the cam shaft 16 and bringing the cam 30 into engagement with the contact wheel 26 on the fork 21 causing its brake to be set, brake ring 57 and the gear frame 58—68 being held against rotation whereby the counter shaft 15 is caused to be rotated at a slow speed through the gear 69, planetary gears 63, 64 and 55, gears 54 and 54ª. When it is desired to run under the second or next higher speed the cam shaft is further rotated by moving the lever into notch 2, thus releasing the ring 57 and bringing the cam arm 28 into contact with the spring fork 19, thus connecting clutch ring 48 to clutch ring 47, whereby the counter shaft is driven at a correspondingly increased speed through the gears 51 and 52. To run under the third or highest speed the lever is carried into the notch 3 releasing clutch ring 48 and connecting clutch ring 49 to the opposite side of ring 47 which drives the counter shaft 15 at a much higher speed through the gears 54 and 54ª.

To reverse the mechanism and run the vehicle in the opposite direction the lever is carried to the R or reverse position, thereby operating cam arm 31 and fork 22 to set the brake and retain the inner ring 60 which holds the gear 61 against rotation through its connecting sleeve 62ª. The action then through the planetary gears 69, 63, 62 and 61 causes the frame 58 to rotate and drives the counter shaft 15 at a slow speed backwards in a reverse direction through the gears 64, 55, 54 and 54ª. It will be seen by this construction that this operating lever may be moved from the reverse to the extreme forward or high speed position, and vice versa, without fear of harming the mechanism, as each engaging element will be actuated momentarily, but owing to the film of oil between the disks they will not be brought into frictional contact as the lever is carried along.

My improved transmission mechanism is extremely simple in construction, effective in its operation and reduces to a minimum the possibility of damage to the parts resulting from inexperienced or careless operators.

My invention is not restricted to the precise construction and arrangement of parts herein shown and described nor to the various details thereof, as the same may be modified or re-arranged in various particulars without departing from the spirit and scope of my invention, one practical embodiment of which has been herein illustrated and described without attempting to show all of the various forms and modifications in which my invention might be embodied.

Having thus described my invention, what I claim as new and desire to secure by Letters Patent, is:

1. An improved transmission mechanism comprising a driving shaft, a pinion keyed to said shaft, a second pinion adjacent the first pinion and free to rotate on said shaft, a driven shaft geared with the latter pinion, planetary gearing surrounding said driving shaft and formed of elongated gears engaging both of said pinions, and means for preventing planetary movement of said planetary gears, whereby the driven shaft will be rotated in a forward direction.

2. An improved transmission mechanism comprising a driving shaft, a pinion keyed to said shaft, a second pinion adjacent the first pinion and free to rotate on said shaft, a driven shaft geared with the latter pinion, a frame mounted to rotate on said driving shaft, planetary gearing mounted in said frame and formed of elongated gears engaging both pinions, a brake having a stationary member and a movable member, said movable member being connected to said frame, and means for operating said brake.

3. An improved transmission mechanism comprising a driving shaft, a driven shaft spaced apart therefrom, a system of planetary gearing surrounding said driving shaft, means for transmitting power from said planetary gearing to said driven shaft to drive the latter in either direction, a brake controlling said planetary gear, and an oscillating cam for operating said brake.

4. An improved transmission mechanism comprising a driving shaft, a pinion keyed to said shaft, a second pinion adjacent the first pinion and free to rotate on said shaft, a driven shaft geared with the latter pinion, a frame mounted to rotate on said driving shaft, planetary gearing mounted in said frame and engaging both pinions, a brake having a stationary member and a movable member, the latter being connected to said frame, a rock shaft, and a radially extended cam arm for operating said brake.

5. A transmission mechanism comprising a casing, a driving shaft, a driven shaft, a system of planetary gearing mounted on and driven by said driving shaft, power transmitting means connecting said gearing with said driven shaft, a frame in which a portion of said gearing is mounted, a brake, one member of which is permanently held against rotation, a second member of said brake being connected to said frame, a cam, a controlling lever, a resilient member intermediate said cam and said second brake member, and means whereby the movement of said lever will cause said cam through said resilient member to set said brake members together whereby said frame is held and a slow motion is transmitted through said gearing to said driven shaft.

6. A transmission mechanism comprising a driving shaft, a driven shaft, a system of planetary gearing driven from said driving shaft and connected to said driven shaft, a frame in which a portion of said gearing is mounted, a friction brake, one member of which is held against rotation, a second member of said brake being connected to said frame, a resilient spring fork pivoted at one end and arranged to operate said second brake member through its opposite end, a cam arranged to actuate said fork to connect said brake members and hold said frame, whereby said driven shaft is driven through said planetary gearing at a slow speed ratio.

7. An improved transmission mechanism comprising a driving shaft, a driven shaft spaced apart therefrom, gearing interposed between said shafts, a system of planetary gearing surrounding said driving shaft, a frame in which a portion of said planetary gearing is mounted, a brake formed with a stationary member and a movable member, the latter being in engagement with one of the gears of said planetary gearing, and an oscillating cam arm for operating said brake.

8. A transmission mechanism comprising a driving shaft, a driven shaft, a system of planetary gearing driven from said driving shaft, one of the gears of said system being connected to said driven shaft, a brake having one member permanently fixed, a second member of said brake connected to one of said gears of said system, a cam, a controlling lever, and a resilient member intermediate said cam and said second brake member.

9. A transmission mechanism comprising a driving shaft, a driven shaft, a system of planetary gearing driven from said driving shaft, power transmitting means connecting said gearing with said shaft, a friction brake, one member of which is held against rotation, a second member of said brake connected to one of said gears of said system, a resilient spring fork pivoted at one end and arranged to operate said second brake member through its opposite end, a cam arranged to actuate said fork to connect said brake members to hold said gear, whereby a slow reverse motion through said planetary gearing is transmitted to said driven shaft.

10. An improved transmission mechanism comprising a driving shaft, a driven shaft, a plurality of sets of gears for different speeds connecting said shafts, a system of planetary gearing encircling the driving shaft and adapted to drive one of said sets of connecting gears, a plurality of clutches one controlling each set of connecting gears, and means for independently operating said clutches, whereby power is transmitted to said driven shaft through but one set of connecting gears.

11. A transmission mechanism comprising a driving shaft, a driven shaft, power transmission mechanism between said shafts provided with means for varying the speed ratio, frictional members controlling said power transmitting mechanism, oscillating cams for operating said frictional members, a hand lever for controlling said cams, and a foot lever also connected to control said cams.

12. A transmission mechanism comprising a driving shaft, a driven shaft, power transmission mechanism between said shafts provided with means for varying the speed ratio, frictional members controlling said power transmission mechanism, a rock shaft, radially arranged cam arms mounted on said shaft, a hand lever for rocking said rock shaft, and a foot lever also connected to oscillate said rock shaft.

13. In a transmission mechanism, a driving shaft, a plurality of frictional members mounted on said shaft, a cam shaft, a cam for operating each frictional member mounted on said shaft, a counter-shaft, power transmitting means between said frictional members and said counter-shaft through which the speed ratio of the latter may be varied, a hand operated lever for moving said cams through their shaft to engage one clutch at a time to change the speed ratio of the counter-shaft, and a foot operated lever connected to the pivoted end of said hand lever whereby said frictional members may also be operated by the movement of the foot.

In testimony whereof I affix my signature in presence of two witnesses.

HENRY CAVE.

Witnesses:
HOWARD E. BARLOW,
E. I. OGDEN.